US012581554B2

(12) United States Patent
Alary

(10) Patent No.: US 12,581,554 B2
(45) Date of Patent: Mar. 17, 2026

(54) COMMUNICATION METHOD FOR NEAR-FIELD COMMUNICATION DEVICES

(71) Applicant: STMicroelectronics (Rousset) SAS, Rousset (FR)

(72) Inventor: Philippe Alary, Puyloubier (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 366 days.

(21) Appl. No.: 18/119,626

(22) Filed: Mar. 9, 2023

(65) Prior Publication Data

US 2023/0300919 A1 Sep. 21, 2023

(30) Foreign Application Priority Data

Mar. 16, 2022 (FR) ...................................... 2202280

(51) Int. Cl.
| | |
|---|---|
| *H04B 5/77* | (2024.01) |
| *H04B 5/20* | (2024.01) |
| *H04L 1/18* | (2023.01) |
| *H04W 76/14* | (2018.01) |

(52) U.S. Cl.
CPC .............. *H04W 76/14* (2018.02); *H04B 5/20* (2024.01); *H04L 1/18* (2013.01)

(58) Field of Classification Search
CPC .. H02J 50/80; H02J 50/10; H02J 50/12; H02J 50/60; H02J 7/007; H02J 7/02; H02J 50/90; H02H 9/045
See application file for complete search history.

(56) References Cited

U.S. PATENT DOCUMENTS

| | | | | |
|---|---|---|---|---|
| 10,353,384 | B1 * | 7/2019 | Tran ........................ | G08C 17/02 |
| 11,043,832 | B2 * | 6/2021 | Melgarejo ............... | H02J 50/40 |
| 2013/0005244 | A1 | 1/2013 | Laws et al. | |
| 2016/0174267 | A1 | 6/2016 | Mofidi et al. | |
| 2016/0336816 | A1 * | 11/2016 | Mach ...................... | H02J 50/10 |
| 2017/0018946 | A1 * | 1/2017 | Brink ..................... | H04B 5/266 |
| 2017/0324794 | A1 * | 11/2017 | Jeong .................... | H04L 67/025 |
| 2019/0191477 | A1 | 6/2019 | Jang | |
| 2019/0260241 | A1 * | 8/2019 | Park ...................... | H04L 5/0055 |
| 2020/0153239 | A1 * | 5/2020 | Pifferi ...................... | H02J 7/02 |
| 2020/0235612 | A1 * | 7/2020 | Muratov ................. | H02J 50/10 |
| 2020/0266667 | A1 * | 8/2020 | Lee ........................ | H02J 50/90 |

(Continued)

FOREIGN PATENT DOCUMENTS

| | | |
|---|---|---|
| CN | 102857271 A | 1/2013 |
| CN | 113329379 A | 8/2021 |

(Continued)

OTHER PUBLICATIONS

INPI Search Report and Written Opinion for priority application, FR 2202280, report dated Oct. 26, 2022, 9 pgs.

*Primary Examiner* — Cindy Trandai
(74) *Attorney, Agent, or Firm* — Crowe & Dunlevy LLC

(57) ABSTRACT

A first near-field communication device is remotely powered by a second near-field communication device. The first near-field communication device receives from the second near-field communication device a frame indicating a failure of a data reception by the second near-field communication device. In response, at least one transmission parameter of the first near-field communication device is modified prior to another attempt of transmission of the data.

20 Claims, 2 Drawing Sheets

(56)     References Cited

U.S. PATENT DOCUMENTS

| | | | | |
|---|---|---|---|---|
| 2020/0343765 A1* | 10/2020 | Kwon | ................... | H02J 50/10 |
| 2020/0366135 A1 | 11/2020 | Kim et al. | | |
| 2020/0366137 A1* | 11/2020 | Park | ..................... | H02J 50/60 |
| 2021/0013749 A1* | 1/2021 | Louis | ..................... | H02J 50/60 |
| 2021/0091601 A1* | 3/2021 | Kim | ..................... | H01F 38/14 |
| 2021/0281125 A1* | 9/2021 | Sato | ..................... | H04B 5/24 |
| 2021/0305849 A1* | 9/2021 | Shimura | ................ | H02J 50/80 |
| 2021/0409116 A1* | 12/2021 | Krimmer | .............. | H04B 10/69 |
| 2022/0224166 A1* | 7/2022 | Sato | ..................... | H02J 50/60 |
| 2022/0231544 A1* | 7/2022 | Yu | ..................... | H04B 5/79 |
| 2022/0312650 A1* | 9/2022 | Bi | ..................... | H02J 7/00034 |
| 2023/0074976 A1* | 3/2023 | Nakanishi | ............ | H02J 50/005 |
| 2023/0107009 A1* | 4/2023 | van Wageningen | .... | H02J 50/60 |
| | | | | 307/104 |
| 2023/0318363 A1* | 10/2023 | Kim | ..................... | H02J 50/10 |
| | | | | 307/104 |
| 2024/0146829 A1* | 5/2024 | Kim | ..................... | H04L 69/24 |
| 2024/0356384 A1* | 10/2024 | Lee | ..................... | H02J 50/40 |

FOREIGN PATENT DOCUMENTS

| | | | |
|---|---|---|---|
| WO | 2016100112 A1 | 6/2016 | |
| WO | 2019039898 A1 | 2/2019 | |

* cited by examiner

EXAMPLE 1　　　　　　　　EXAMPLE 2

COMMUNICATION METHOD FOR NEAR-FIELD COMMUNICATION DEVICES

PRIORITY CLAIM

This application claims the priority benefit of French Application for Patent No. 2202280, filed on Mar. 16, 2022, the content of which is hereby incorporated by reference in its entirety to the maximum extent allowable by law.

TECHNICAL FIELD

The present disclosure generally concerns electronic devices. The present disclosure more particularly concerns electronic devices integrating a near-field communication (NFC) circuit, more commonly called NFC devices, and near-field communication devices implemented by such devices.

BACKGROUND

When an NFC device communicates in near field with another NFC device located within range, these devices exchange data in the form of request and response frames transmitted in turns by the NFC devices. Sometimes, data transmitted by one of the NFC devices are not correctly received by the other NFC device, thus adversely affecting the communication between these devices.

It would be desirable to improve existing NFC devices and existing methods of near-field communication between NFC devices.

There is a need in the art to overcome all or part of the disadvantages of known NFC devices and of known methods of near-field communication between NFC devices.

SUMMARY

An embodiment provides a method wherein, in case of a reception, by a first near-field communication device remotely powered by a second near-field communication device, of a frame indicating a failure of a data reception by the second device, at least one transmission parameter of the first device is modified prior to another attempt of transmission of said data.

According to an embodiment, said at least one parameter is a duration between an end of transmission of a request by the second device and a beginning of transmission of a response by the first device.

According to an embodiment, said at least one parameter is an amplitude of modulation, by the first device, of an electromagnetic field radiated by the second device.

According to an embodiment, the modulation amplitude is decreased if the field has an intensity smaller than a first threshold and increased if the field has an intensity greater than a second threshold.

According to an embodiment, the intensity of the field is estimated by a current sensor of the first NFC device.

According to an embodiment, said at least one parameter is a frequency of synchronization of a calculation unit of the first device.

According to an embodiment, said at least one parameter comprises durations of transition of the first device between reception, processing, and transmission phases.

According to an embodiment, said at least one parameter is stored in a register of a non-volatile memory of the first device.

According to an embodiment, the frame indicating the failure of the data reception by the second device is consecutive to a transmission, by the first device, of a response frame.

An embodiment provides a near-field communication device configured to implement the method such as described.

BRIEF DESCRIPTION OF THE DRAWINGS

The foregoing features and advantages, as well as others, will be described in detail in the rest of the disclosure of specific embodiments given by way of illustration and not limitation with reference to the accompanying drawings, in which.

DETAILED DESCRIPTION

Like features have been designated by like references in the various figures. In particular, the structural and/or functional features that are common among the various embodiments may have the same references and may dispose identical structural, dimensional and material properties.

For the sake of clarity, only the steps and elements that are useful for an understanding of the embodiments described herein have been illustrated and described in detail. In particular, the generation of the radio frequency signals and the interpretation thereof have not been detailed, the described embodiments being compatible with usual techniques of generation and interpretation of these signals.

Unless indicated otherwise, when reference is made to two elements connected together, this signifies a direct connection without any intermediate elements other than conductors, and when reference is made to two elements coupled together, this signifies that these two elements can be connected or they can be coupled via one or more other elements.

In the following disclosure, unless otherwise specified, when reference is made to absolute positional qualifiers, such as the terms "front", "back", "top", "bottom", "left", "right", etc., or to relative positional qualifiers, such as the terms "above", "below", "upper", "lower", etc., or to qualifiers of orientation, such as "horizontal", "vertical", etc., reference is made to the orientation shown in the figures.

Unless specified otherwise, the expressions "around", "approximately", "substantially" and "in the order of" signify within 10%, and preferably within 5%.

In the present description, "NFC device" designates an electronic device integrating at least one near-field communication circuit (NFC).

Figures 1, 2, 3:
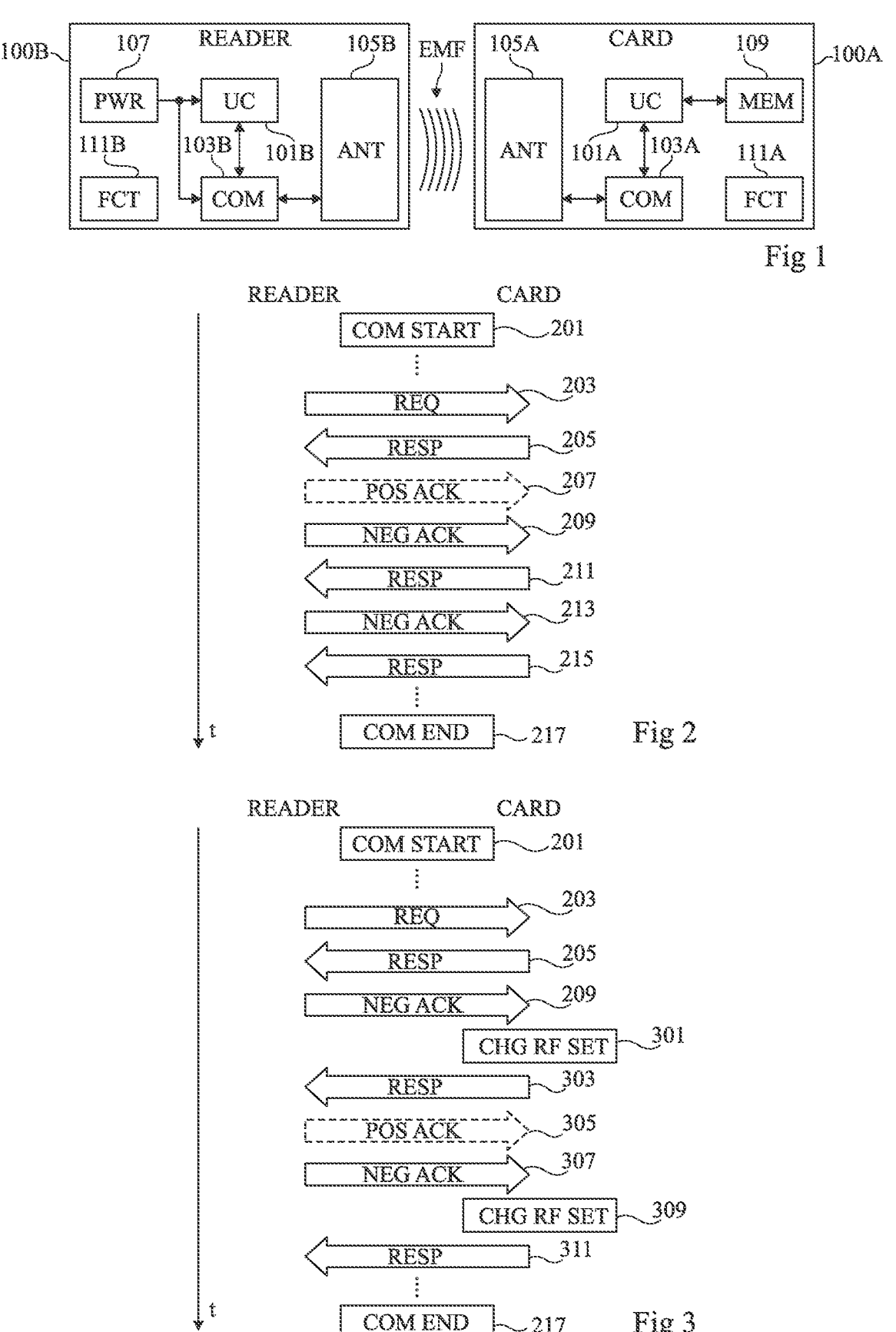
FIG. 1 schematically shows in the form of blocks an example of a near-field communication system of the type to which the described embodiments apply as an example.
FIG. 2 is a timing diagram illustrating successive steps of an example of a method of communication between NFC devices.
FIG. 3 is a timing diagram illustrating successive steps of a method of communication between NFC devices according to an embodiment.

FIG. 1 schematically shows in the form of blocks an example of a near-field communication system of the type to which described embodiments apply as an example.

In the shown example, a first NFC device 100A (CARD) communicates, by near-field electromagnetic coupling, with a second NFC device 100B (READER) located within range. In this example, first NFC device 100A more specifically operates in so-called card mode, while second NFC device 100B operates in so-called reader mode. As an example, NFC device 100A is a microcircuit card, for example, a bank card, a personal access card, an identity card, a passport, etc., or more generally any type of passive NFC device, that is, deprived of an internal power source.

In the example illustrated in FIG. 1, each NFC device 100A, 100B comprises a processing unit 101A, 101B (UC), for example, a microcontroller, a microprocessor, a programmable logic circuit, a state machine, etc. Processing units 101A and 101B are configured to implement steps of a communication method, for example, by controlling a sequential execution of operations aiming at allowing data exchanges, in near field, between NFC devices 100A and 100B.

In the illustrated example, each NFC device 100A, 100B further comprises a near-field communication circuit, or oscillating circuit, 103A, 103B (COM), connected to the processing unit 101A, 101B of the device. Circuits 103A and 103B may each comprise elements of generation and processing of signals to be transmitted, or of signals received, by NFC device 100A or 100B. As an example, each circuit 103A, 103B may comprise one or a plurality of elements selected from among a signal generator, a digital-to-analog converter of the signals to be transmitted, an analog-to-digital converter of the received signals, a modulation-demodulation circuit (modem), an impedance matching circuit, a radio frequency noise filtering circuit, etc.

In this example, NFC devices 100A, 100B further each comprise a near-field communication antenna 105A, 105B (ANT). The antenna 105A of NFC device 100A is configured to capture a radio frequency electromagnetic field (EMF) radiated by the antenna 105B of NFC device 100B. When the antenna 105A of NFC device 100A captures the EMF field emitted by the antenna 105B of NFC device 100B, a coupling forms between the circuits 103A and 103B of these devices. This coupling results in a variation of the load formed by the circuits of NFC device 100A on the circuit 103B for generating the EMF field of NFC device 100B.

In practice, to establish a communication between NFC devices 100A and 100B, a phase or amplitude variation of the EMF field is detected by NFC device 100B, which then starts a protocol of near-field communication with NFC device 100A. More precisely, the detection is, for example, performed by detecting, on the side of NFC device 100B, whether an amplitude of a voltage across circuit 103B and/or a phase shift with respect to the signal generated by circuit 103B come out of amplitude and/or phase ranges.

Once NFC device 100B has detected the presence of NFC device 100A in its field, it starts a procedure for establishing a communication, implementing transmissions of requests by NFC device 100B and of responses by NFC device 100A (polling sequence such as defined in the NFC Forum, EMV (Europay Mastercard Visa), or ISO 14443 standard specifications).

In the shown example, NFC device 100B comprises a power source 107 (PWR). Source 107 may, as illustrated in FIG. 1, be a source internal to NFC device 100B, for example, of battery type. As a variant, NFC device 100B may be powered by an external source, for example of electric distribution network, or mains, type. Source 107 enables to power with electric energy one or a plurality of elements of NFC device 100B, for example, processing unit 101B and the circuit 103B of device 100B as illustrated in FIG. 1. Source 107 further enables to electrically power NFC device 100A via the EMF field radiated by NFC device 100B. NFC device 100A is exclusively powered in near field, or remotely powered, by NFC device 100B, the electric energy useful to the operation of NFC device 100A being entirely drawn from the EMF field.

In the example illustrated in FIG. 1, NFC device 100A further comprises a memory 109 (MEM) comprising at least one non-volatile storage area. Memory 109 is connected to processing unit 101A and, for example, enables to non-transiently store program code instructions which, when they are executed by processing unit 101A, enable NFC device 100A to implement the near-field communication method with NFC device 100B. Memory 109 may further comprise one or a plurality of volatile storage areas enabling, for example, to temporarily record values of variables linked to the execution of the program by processing unit 101A.

According to the targeted application, each NFC device 100A, 100B may further comprise various other elements or circuits symbolized, in FIG. 1, by a functional block 111A, 111B (FCT). Although this has not been detailed in FIG. 1, NFC devices 100A and 100B may further each comprise one or a plurality of data, address, and/or control buses between the different elements of these devices and one or a plurality of input-output interfaces.

FIG. 2 is a timing diagram illustrating, according to time t, a chaining of successive steps of a method of communication between NFC devices, for example, NFC devices 100A (CARD) and 100B (READER) respectively located on the right-hand side and on the left-hand side in FIG. 2.

During a step 201 (COM START), a near-field communication is established between reader device 100B and card device 100A. This corresponds to a case where device 100A is detected within range of device 100B, for example, when device 100A is brought towards NFC device 100B at a sufficiently short distance to cause, on the side of device 100B, a crossing of the amplitude threshold of the voltage across circuit 103B and/or of the phase shift threshold with respect to the signal generated by circuit 103B.

During another step 203 (REQ), subsequent to step 201, reader device 100B transmits a request frame to card device 100A. By the sending of this request, NFC device 100B may, for example, ask NFC device 100A to transmit thereto data corresponding to a content of one or a plurality of areas of its memory 109. As an example, the request frame transmitted by NFC device 100B comprises a block called supervisory block, or S-block. Although this has not been detailed in FIG. 2, NFC devices 100A and 100B may execute other usual near-field communication operations between steps 201 and 203.

During still another step 205 (RESP), subsequent to step 203, card device 100A transmits a response frame to reader device 100B. The response, for example, contains the data of the memory 109 of NFC device 100A that NFC device 100B had, by the sending of the request frame at step 203, indicated that it desired to obtain. As an example, the response frame transmitted by NFC device 100A comprises a so-called information block, or I-block.

If the response frame originating from card device 100A is correctly received by reader device 100B, device 100B then transmits, at still another step 207 (POS ACK) subsequent to step 205, a so-called acknowledge frame intended to inform device 100A that the transmission of the response frame has occurred seamlessly. As an example, the frame transmitted by device 100B at step 207 comprises a block called receive ready block, or R-block. The frame of step 207 for example more precisely comprises a block R containing a positive acknowledge, more simply designated with acronym "R(ACK)".

According to the needs of the application, the near-field communication between NFC devices 100A and 100B may then either carry on normally, with the possibility for another request frame different from that of step 203 to, for example, be transmitted by device 100B to obtain other data stored in memory 109, or be interrupted, for example, if all the desired data exchanges have been able to be performed. To avoid overloading the drawing, the step(s) likely to be executed subsequently to step 207, which correspond to a usual communication, have not been detailed in FIG. 2.

However, if the response frame of step 205 is not correctly received by reader device 100B, for example if device 100B does not receive all or part of this frame, device 100B then transmits, at still another step 209 (NEG ACK) subsequent to step 205, an acknowledge frame intended to inform device 100A that the transmission of the response frame has failed. The failure of this transmission may result from different causes, or interoperability problems, for example, a variability of a form factor of antennas 105A and 105B, a coupling defect between reader device 100B and card device 100A, the use of a reader device 100B non-compliant with near-field communication standards used by card device 100A, etc. As an example, the acknowledge frame transmitted by device 100B at step 209 comprises an R-block containing a negative acknowledge, more simply designated with acronym "R(NAK)".

In the case where the second attempt to transmit the response frame at step 205 has failed, card device 100A then attempts again, during still another step 211 (RESP) subsequent to step 209, to send for a third time the response frame to reader device 100B. Step 211 is identical to step 205. More precisely, the content and the mode of transmission of the response frame by NFC device 100A are unchanged, at step 211, with respect to step 205.

If the response frame of step 211 is not correctly received by reader device 100B, device 100B then transmits again, during still another step 213 (NEG ACK) subsequent to step 211, an acknowledge frame informing device 100A of the failure of the transmission of the response frame of step 211. This, for example, corresponds to a situation where the interoperability problem which would affect the transmission of the response frame during step 205 is still present during step 211. Step 213 is, for example, identical or similar to step 209.

In the case where the second attempt to transmit the response frame at step 211 has failed, card device 100A then attempts again, during still another step 215 (RESP) subsequent to step 213, to send for a third time the response frame to reader device 100B. Step 215 is identical to steps 205 and 211. More precisely, the content and the mode of transmission of the response frame by NFC device 100A are unchanged, at step 215, with respect to steps 205 and 211.

A plurality of failures of reception, by reader device 100B, of the response frame of card device 100A, separated by a plurality of sendings, by reader device 100B, of negative acknowledge frames aiming at informing card device 100A of these failures, may thus follow one another until still another step 217, subsequent to step 215, during which the communication between NFC devices 100A and 100B stops. As an example, NFC device 100B may end the near-field communication with NFC device 100A after having successively sent from 3 to 5 negative acknowledge frames comprising a block R(NAK).

If the interoperability problems are solved before step 217, the communication between NFC devices 100A and 100B may resume normally and the desired data exchanges are for example integrally performed. However, the repeated sending of a same response frame of device 100A and of acknowledge frames of device 100B cause an undesirable increase in the communication time.

However, if the interoperability problems subsist until step 217, the communication between NFC devices 100A and 100B ends before the desired data exchanges have been brought to an end. This then results in a near-field communication failure between devices 100A and 100B, adversely affecting the user experience of these devices.

FIG. 3 is a timing diagram illustrating successive steps of a method of communication between NFC devices, for example NFC devices 100A (CARD) and 100B (READER) respectively located on the right-hand side and on the left-hand side in FIG. 3, according to an embodiment.

Generally, the embodiment of FIG. 3 provides that in case of a reception, by NFC device 100A remotely powered by NFC device 100B, of a frame indicating a failure of a data reception by NFC device 100B, at least one transmission parameter of NFC device 100A is modified prior to another attempt of transmission of said data.

The timing diagram of FIG. 3 has elements in common with the timing diagram of FIG. 2. These common elements will not be described again hereafter. More precisely, the timing diagram of FIG. 3 comprises steps 201 (COM START), 203 (REQ), 205 (RESP), 209 (NEG ACK), and 217 (COM END) previously discussed in relation with FIG. 2. The timing diagram of FIG. 3 differs from that of FIG. 2 in that the timing diagram of FIG. 3 comprises a step 301 (CHG RF SET) of modification of one or a plurality of radio frequency communication parameters of card device 100A. Step 301 is, as illustrated in FIG. 3, subsequent to step 209 of transmission of the frame aiming at informing card device 100A of the failure of the reception of the data contained in the response frame transmitted by device 100A during step 205.

Card device 100A then attempts, during another step 303 (RESP) subsequent to step 209, to send back the response frame to reader device 100B. Step 303 differs from step 205 in that, during step 303, at least one radio frequency communication parameter of NFC device 100A has been modified with respect to step 205. This advantageously enables, with respect to the method of FIG. 2, to increase chances of overcoming the interoperability problem having affected the data transmission at step 205 and subsisting for example at step 303. The content of the response frame transmitted at step 303 by NFC device 100A is preferably identical to that of the response frame transmitted at step 205.

If the response frame originating from card device 100A is this time correctly received by reader device 100B, device 100B then transmits, at still another step 305 (POS ACK) subsequent to step 303, an acknowledge frame intended to inform device 100A that the transmission of the response frame has succeeded. Step 305 of FIG. 3 is, for example, identical or similar to the step 207 of FIG. 2. According to the needs of the application, the near-field communication between NFC devices 100A and 100B may either carry on normally, or be interrupted as previously discussed in relation with FIG. 2. To avoid overloading the drawing, the steps that can be executed subsequently to step 305, which correspond to a usual communication, have not been illustrated in FIG. 3.

However, if the response frame of step 303 is not correctly received by reader device 100B, for example if device 100B does not receive all or part of this frame, device 100B then transmits, at still another step 307 (NEG ACK) subsequent to step 303, an acknowledge frame intended to inform device 100A that the transmission of the response frame has failed.

In the case where the second transmission of the response frame during step 303 has failed, one or a plurality of radio frequency communication parameters of card device 100A are modified during still another step 309 (CHG RF SET), subsequent to step 307. The parameter(s) modified during step 309 may be identical to the radio frequency parameters modified during step 301. As an example, a value or a state of this or these parameter(s) may be modified, at step 309, with respect to step 301. As a variant, the parameter(s) modified during step 309 may be different, totally or partly, from the radio frequency parameter(s) modified during step 301.

Card device 100A then attempts, during another step 311 (RESP) subsequent to step 309, to send back the response frame to reader device 100B. Step 311 differs from steps 205 and 303 in that, during step 311, at least one radio frequency communication parameter has been modified with respect to steps 205 and 303. This advantageously enables, with respect to the method of FIG. 2, to further increase chances of overcoming the interoperability problem having affected the data transmission at steps 205 and 303, and which is for example still present at step 311.

Although this has not been illustrated in FIG. 3, a plurality of failures of reception, by reader device 100B, of the response frame of card device 100A, separated by a plurality of sendings, by reader device 100B, of acknowledge frames aiming at informing card device 100A of these failures, may thus follow one another prior to step 217, subsequent to step 311, during which the near-field communication between NFC devices 100A and 100B stops. Before each new sending of a same response frame by NFC device 100A, one or a plurality of radio frequency communication parameters are for example modified as discussed hereabove in relation with steps 301 and 309.

An advantage of the communication method discussed hereabove in relation with FIG. 3 lies in the fact that it enables, with respect to the method of FIG. 2, to increase chances of overcoming an interoperability problem before the communication between NFC devices 100A and 100B ends, thus to complete all the desired data exchanges between these devices. This causes an improvement of the user experience of NFC devices 100A and 100B.

Figure 4:
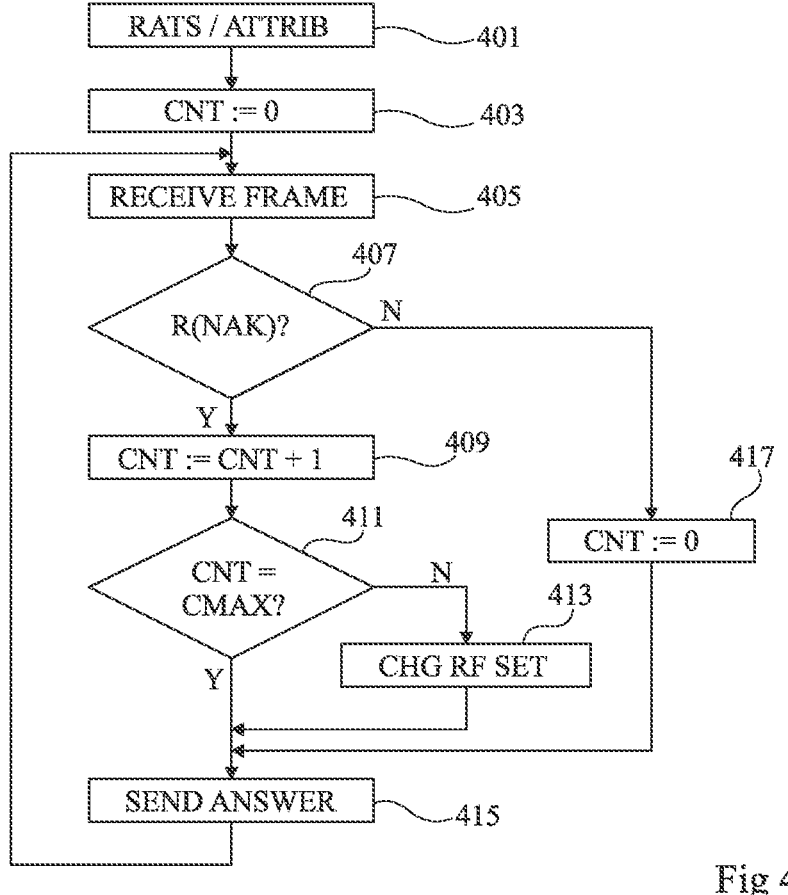
FIG. 4 is a logical diagram illustrating an example of implementation of the communication method of FIG. 3.

FIG. 4 is a logical diagram illustrating an example of implementation of the communication method of FIG. 3. The logical diagram of FIG. 4 is, for example, implemented by the processing unit 101A of NFC device 100A.

During an initial step 401 (RATS/ATTRIB), the communication between NFC devices 100A and 100B starts, for example by a transmission of a frame called request for answer to select (RATS) or an attribution frame (ATTRIB).

As an example, during another step 403 (CNT:=0), subsequent to step 401, a counter CNT is initialized by assigning to counter CNT a value, for example zero. In the logical diagram illustrated in FIG. 4, each value of counter CNT corresponds to a different state, or to a different value, of at least one radio frequency communication parameter of NFC device 100A. The values of counter CNT are integer values and smaller than or equal to a non-zero maximum value CMAX, for example, equal to 2. As an example, each value of counter CNT corresponds to a configuration, or a parameterizing, of the near-field communication circuit 103A of NFC device 100A. Thus, in the case where the maximum value CMAX of counter CNT is equal to 2, three different configurations of circuit 103A may, for example, be successively applied to attempt solving a problem affecting the communication between NFC devices 100A and 100B. The configuration applied when counter CNT has a zero value for example corresponds to a default or standard configuration, for example, a configuration enabling to achieve a near-field communication in a majority of cases of use of NFC device 100A.

During still another step 405 (RECEIVE FRAME), subsequent to step 403, a frame transmitted by NFC device 100B is received by NFC device 100A. This frame, for example, comprises a plurality of application protocol data units (APDU). Although this has not been detailed in FIG. 4, the transmission of the frame by NFC device 100B is, for example, consecutive to a transmission of a request, by NFC device 100B, and then to an attempt to send data, by NFC device 100A, as previously discussed in relation with steps 203 and 205 of the method of FIG. 3.

During still another step 407 (R(NAK)?), subsequent to step 405, NFC device 100A controls whether the frame originating from NFC device 100B contains a negative acknowledge block, or R(NAK) block, that is, if a communication problem has occurred.

In a case where the frame contains a block R(NAK) (output Y of block 407), for example, due to the presence of an interoperability problem between NFC devices 100A and 100B, counter CNT is incremented during still another step 409 (CNT:=CNT+1), subsequent to step 407. During step 409, the value of counter CNT is increased by one unit.

During still another step 411 (CNT=CMAX?), subsequent to step 409, NFC device 100A controls whether the value of counter CNT is equal to maximum value CMAX, that is, equal to 2 in this example. The value of counter CNT being equal to 1 at this stage (output N of block 411), at least one radio frequency communication parameter of NFC device 100A is modified during still another step 413 (CHG RF SET) subsequent to step 411. Step 413 is, for example, identical or similar to the step 301 previously described in relation with FIG. 3.

During still another step 415 (SEND ANSWER), subsequent to step 413, NFC device 100A attempts to send back a response frame to NFC device 100B by applying the parameter(s) modified at step 413.

NFC device 100A then returns to step 405 of reception of a frame transmitted by NFC device 100B. As long as the frame received at step 405 contains a negative acknowledge block R(NAK) and the value of counter CNT is smaller than maximum value CMAX, the previously-described steps 407, 409, 411, 413, and 415 are repeated. When counter CNT reaches its maximum value CMAX (output Y of block 411), the radio frequency communication parameters of NFC device 100A are no longer modified at step 413 and the transmission of the response frame is performed, at step 415, by applying the parameter(s) corresponding to value CMAX of counter CNT.

In a case where the frame received by NFC device 100A during step 405 contains no negative acknowledge block R(NAK) (output N of block 407), the value of counter CNT is reset at still another step 417 (CNT:=0) subsequent to step 407 and the transmission of the response frame is performed, at step 415, by applying the radio frequency communication parameter(s) corresponding to a zero value of counter CNT. In other words, NFC device 100A applies the default configuration of circuit 103A at the beginning of each new near-field communication and as soon as an interoperability problem could have been overcome.

As a variant, it may be provided for counter CNT to be reset after having reached its maximum value CMAX. This would, in case of an interoperability problem for example, amount to an attempt transmitting a frame to NFC device 100B by cyclically applying all the possible configurations of circuit 103A.

Further, although this has not been illustrated in FIG. 4, it may be provided to interrupt the near field communication between NFC devices 100A and 100B after, for example, one or a plurality of attempts of transmission of a frame to NFC device 100B by applying the configuration corresponding to the maximum value CMAX of counter CNT.

Figure 5:
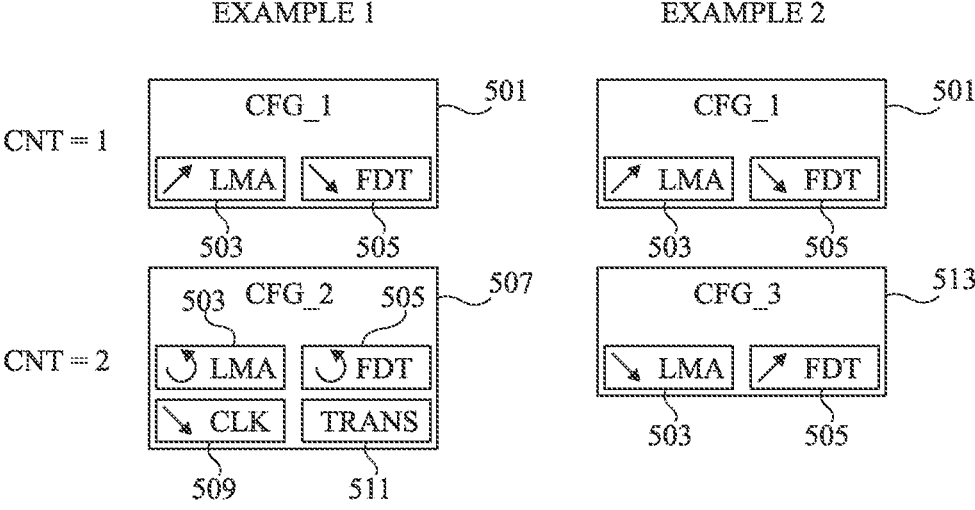
FIG. 5 shows examples of implementation of the communication method of FIGS. 3 and 4.

FIG. 5 shows examples of implementation of the communication method of FIGS. 3 and 4.

FIG. 5 more precisely shows a first example of implementation (EXAMPLE 1, on the left-hand side in FIG. 5) where, when the value of counter CNT is equal to 1 (CNT=1), NFC device 100A applies a first radio frequency communication configuration 501 (CFG_1). In configuration 501, a value 503 of load modulation amplitude (LMA) by NFC device 100A is increased with respect to a default value, applied when counter CNT has a zero value. The fact of increasing load modulation amplitude value 503 enables, for example, to ease the communication between NFC devices 100A and 100B in a case where the EMF field radiated by NFC device 100B has a low intensity. The intensity of the EMF field emitted by NFC device 100B is, for example, estimated by a current sensor of NFC device 100A and compared with a low threshold having its crossing indicating the presence of a low-intensity field. As an example, the increase of value 503 of load modulation amplitude between the initial configuration, in the case where counter CNT has a zero value, and configuration 501 is in the order of 5%, for example, in the range from 5 to 10 mV.

Further, in first configuration 501, another value 505 of frame delay time (FDT) is decreased with respect to a default value applied when counter CNT has a zero value. Value 505 corresponds, for example, to a duration between an end of transmission of a request by NFC device 100B and a beginning of transmission of a response by NFC device 100A. The fact of decreasing value 505 enables, for example, to ease the communication in a case where the EMF field radiated by NFC device 100B has a low intensity. As an example, the decrease in value 505 between the initial configuration and configuration 501 is in the order of −2/fc, where fc represents an oscillation frequency of a carrier of the EMF signal radiated by NFC device 100B.

In the first example of implementation, when the value of counter CNT is equal to two (CNT=2), NFC device 100A applies a second radio frequency configuration 507 (CFG_2). In second configuration 507, load modulation amplitude value 503 (LMA) and frame delay time value 505 (FDT) are reset. In other words, in configuration 507, values 503 and 505 identical to those of the default configuration, when counter CNT has a zero value, are applied.

Further, in the second configuration 507 of the first example of implementation, a synchronization frequency 509 (CLK) or clock frequency of the calculation unit 101A of NFC device 100A is decreased with respect to a default value applied when counter CNT has a zero value. The fact of decreasing frequency 509 enables, for example, to decrease electromagnetic disturbances likely to be generated by one or a plurality of elements of NFC device 100A. This eases the communication between NFC devices 100A and 100B. As an example, the decrease of frequency 509 between the initial configuration and configuration 507 is in the order of −20%.

Further, in configuration 507, one or a plurality of durations 511 (TRANS) of transition of NFC device 100A between data frame reception, processing, and transmission phases during the communication with NFC device 100B are modified. As an example, this or these duration(s) are increased in configuration 507 with respect to the initial configuration. This enables to obtain more progressive transitions between the reception, processing, and transmission phases.

FIG. 5 further shows a second example of implementation (EXAMPLE 2, on the right-hand side in FIG. 5) where, when the value of counter CNT is equal to 1 (CNT=1), NFC device 100A applies the first radio frequency communication configuration 501 (CFG_1) such as previously described in relation with the first example of implementation.

In the second example of implementation, when the value of counter CNT is equal to two (CNT=2), NFC device 100A applies a third radio frequency configuration 513 (CFG_3). In third configuration 513, value 503 (LMA) of load modulation amplitude is decreased with respect to the default value when counter CNT has a zero value. The fact of decreasing load modulation amplitude value 503 enables, for example, to ease the communication between NFC devices 100A and 100B in a case where the EMF field radiated by NFC device 100B has a high intensity. The intensity of the EMF field emitted by NFC device 100B is, for example, estimated by a current sensor of NFC device 100A and compared with a low threshold having its crossing indicating the presence of a high-intensity field. As an example, the decrease of load modulation amplitude value 503 between an initial configuration, corresponding to the case where counter CNT has a zero value, and configuration 513 is in the order of −5%, for example, in the range from −5 to −10 mV.

Further, in third configuration 513, frame delay time value 505 (FDT) is increased with respect to the default value applied when counter CNT has a zero value. The fact of increasing value 505 enables, for example, to ease the communication in the presence of an EMF field of high intensity radiated by NFC device 100B. As an example, the increase of value 505 between the initial configuration and configuration 513 is in the order of 2/fc.

Examples of radio frequency communication configurations have been described hereabove in relation with FIG. 5. These examples are not limiting. In particular, other radio frequency communication parameters may be modified. The selection and the parameterizing of the states or values of these parameters is, for example, performed according to expected cases of use of NFC device 100A.

Generally, the method discussed hereabove in relation with FIGS. 4 and 5 advantageously enables NFC device 100A to benefit, in addition to a default radio frequency communication configuration, from at least one alternative radio frequency communication configuration enabling to solve interoperability problems between NFC devices during a near-field communication.

An advantage of the NFC device 100A implementing this method lies in the fact that it enables to avoid near-field communication errors or failures, particularly with respect to an NFC device which would not implement this method.

Various embodiments and variants have been described. Those skilled in the art will understand that certain features of these various embodiments and variants may be combined, and other variants will occur to those skilled in the art. In particular, the examples of radio frequency communication configurations discussed in relation with FIG. 5 are not limiting. More generally, any number of radio frequency communication configurations may be provided according to the targeted application, each configuration implying the modification of one or a plurality of radio frequency communication parameters.

Finally, the practical implementation of the described embodiments and variants is within the abilities of those skilled in the art based on the functional indications given hereabove. In particular, the states or values of the radio frequency communication parameters corresponding to each configuration may for example be stored in the memory 109 of NFC device 100A, for example, in different memory registers accessible via a pointer. These states or values may be defined, in factory, by the manufacturer of NFC device 100A. As a variant, these states or values are parameterized by a user of NFC device 100A.

The invention claimed is:

1. A method, comprising:
establishing a near-field communication connection between a first near-field communication device and a second near-field communication device;
wherein said first near-field communication device is remotely powered by said second near-field communication device;
sending by said first near-field communication device over the established near-field communication connection a transmit frame including data using at least one near-field communication transmission parameter of said first near-field communication device;
receiving by said first near-field communication device an acknowledgement frame indicating a failure by said second near-field communication device to receive said data within the transmit frame sent by said first near-field communication device;
in response to said acknowledgement frame, modifying by said first near-field communication device said at least one near-field communication transmission parameter of said first near-field communication device; and
then resending by said first near-field communication device over the established near-field communication connection the transmit frame including data.

2. The method according to claim 1, wherein said at least one near-field communication transmission parameter of said first near-field communication device that is modified by said first near-field communication device is a duration applied by the first near-field communication device between an end of transmission of a request by the second near-field communication device and a beginning of transmission of a response by the first near-field communication device.

3. The method according to claim 1, wherein said at least one near-field communication transmission parameter of said first near-field communication device that is modified by said first near-field communication device is an amplitude of modulation applied by the first near-field communication device to an electromagnetic field radiated by the second near-field communication device.

4. The method according to claim 3, wherein modifying comprises decreasing the amplitude of modulation applied by the first near-field communication device when the electromagnetic field has an intensity smaller than a first threshold and increasing the amplitude of modulation applied by the first near-field communication device when the electromagnetic field has an intensity greater than a second threshold.

5. The method according to claim 4, further comprising estimating the intensity of the electromagnetic field using a current sensor of the first near-field communication device.

6. The method according to claim 1, wherein said at least one near-field communication transmission parameter of said first near-field communication device that is modified by said first near-field communication device is a frequency of synchronization used by a calculation unit of the first near-field communication device.

7. The method according to claim 1, wherein said at least one near-field communication transmission parameter of said first near-field communication device that is modified by said first near-field communication device comprises durations of transition of the first near-field communication device between reception, processing, and transmission phases.

8. The method according to claim 1, further comprising storing said at least one parameter in a register of a non-volatile memory of the first near-field communication device.

9. The method according to claim 1, wherein said acknowledgement frame is received by said first near-field communication device consecutive to sending by said first near-field communication device of the transmit frame.

10. The method of according to claim 9, wherein said transmit frame comprises a response frame sent by said first near-field communication device following receipt of a data request frame sent by said second near-field communication device.

11. A first near-field communication device, comprising:
an antenna;
a near-field communications circuit coupled to said antenna and configured to establish a near-field communication connection with a second near-field communication device dependent selected one of a plurality of near-field communication transmission parameters of said first near-field communication device;
wherein said first near-field communication device is remotely powered by said second near-field communication device;
wherein said near-field communications circuit is configured to:
send a transmit frame including data over the established near-field communication connection using a first near-field communication transmission parameter of said first near-field communication device;
receive an acknowledgement frame indicating a failure by said second near-field communication device to receive said data within the transmit frame;
in response to said acknowledgement frame, modifying to use a second near-field communication transmission parameter of said first near-field communication device; and
then resending the transmit frame including data over the established near-field communication connection using the second near-field communication transmission parameter of said first near-field communication device.

12. The first near-field communication device according to claim 10, wherein said first and second near-field communication transmission parameters specify different durations applied by the first near-field communication device between an end of transmission of a request by the second near-field communication device and a beginning of transmission of a response by the first near-field communication device.

13. The first near-field communication device according to claim 10, wherein said first and second near-field communication transmission parameters specify different amplitudes of modulation applied by the first near-field communication device to an electromagnetic field radiated by the second near-field communication device.

14. The first near-field communication device according to claim 13, wherein said second near-field communication transmission parameter specifies a decreased amplitude of modulation applied by the first near-field communication device than said first near-field communication transmission parameter when the electromagnetic field has an intensity smaller than a first threshold, and wherein said second near-field communication transmission parameter specifies an increased amplitude of modulation applied by the first near-field communication device than said first near-field communication transmission parameter when the electromagnetic field has an intensity greater than a second threshold.

15. The first near-field communication device according to claim 14, further comprising a current sensor configured to estimate the intensity of the electromagnetic field.

16. The first near-field communication device according to claim 10, wherein said first and second near-field communication transmission parameters specify different frequencies of synchronization used by a calculation unit of the first near-field communication device.

17. The first near-field communication device according to claim 10, wherein said first and second near-field communication transmission parameters specify different durations of transition of the first near-field communication device applied by the first near-field communication device between reception, processing, and transmission phases.

18. The first near-field communication device according to claim 10, further comprising a non-volatile memory configured to store said plurality of near-field communication transmission parameters.

19. The first near-field communication device according to claim 10, wherein said acknowledgement frame is received by said first near-field communication device consecutive to sending by said first near-field communication device of the transmit frame.

20. The first near-field communication device of according to claim 19, wherein said transmit frame comprises a response frame sent by said first near-field communication device following receipt of a data request frame sent by said second near-field communication device.

* * * * *